(12) United States Patent
Efrati

(10) Patent No.: US 9,438,640 B2
(45) Date of Patent: *Sep. 6, 2016

(54) METHOD AND APPARATUS FOR MINIMIZING APPLICATION DELAY BY PUSHING APPLICATION NOTIFICATIONS

(71) Applicant: VONAGE NETWORK LLC, Holmdel, NJ (US)

(72) Inventor: Tzahi Efrati, Hoboken, NJ (US)

(73) Assignee: Vonage America Inc., Holmdel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/471,970

(22) Filed: Aug. 28, 2014

(65) Prior Publication Data

US 2014/0372622 A1 Dec. 18, 2014

Related U.S. Application Data

(63) Continuation of application No. 13/901,224, filed on May 23, 2013, now Pat. No. 8,825,814.

(51) Int. Cl.
*G06F 15/16* (2006.01)
*H04L 29/06* (2006.01)
*H04L 29/08* (2006.01)

(52) U.S. Cl.
CPC ....... *H04L 65/1073* (2013.01); *H04L 65/1006* (2013.01); *H04L 67/10* (2013.01); *H04L 67/34* (2013.01)

(58) Field of Classification Search
CPC .......... H04L 65/1006; H04L 65/1073; H04L 67/10; H04L 67/34
USPC ................ 709/228, 204, 206, 220; 370/352; 455/418, 426.1, 435.1
See application file for complete search history.

(56) References Cited

U.S. PATENT DOCUMENTS

| | | | |
|---|---|---|---|
| 6,490,450 B1 | 12/2002 | Batni et al. | |
| 7,424,538 B2 | 9/2008 | Igarashi et al. | |
| 7,885,925 B1* | 2/2011 | Strong | G06F 17/30038 707/620 |
| 8,055,255 B2* | 11/2011 | Inoue | H04L 12/18 370/310 |
| 8,082,580 B1 | 12/2011 | Desai et al. | |
| 8,249,554 B2* | 8/2012 | Mack | H04W 60/00 455/411 |
| 8,505,033 B2* | 8/2013 | Jonnagadla | G06F 9/546 709/206 |
| 2002/0131395 A1 | 9/2002 | Wang | |
| 2003/0018704 A1 | 1/2003 | Polychronidis et al. | |
| 2005/0249238 A1 | 11/2005 | Haumont | |
| 2005/0272451 A1 | 12/2005 | Ho et al. | |
| 2007/0015498 A1 | 1/2007 | Giacalone et al. | |
| 2007/0223523 A1* | 9/2007 | Montpetit | H04L 41/12 370/465 |
| 2008/0059640 A1 | 3/2008 | Oka et al. | |
| 2008/0172486 A1* | 7/2008 | Danne | H04L 65/1006 709/224 |
| 2008/0267174 A1 | 10/2008 | Mahalank et al. | |
| 2008/0301670 A1* | 12/2008 | Gouge | G06F 17/30867 717/173 |
| 2009/0041058 A1 | 2/2009 | Ikeda et al. | |
| 2009/0103524 A1 | 4/2009 | Mantripragada et al. | |
| 2009/0106768 A1* | 4/2009 | Ramanathan | G06F 17/3089 719/311 |
| 2009/0225746 A1* | 9/2009 | Jackson | H04L 12/5693 370/352 |

(Continued)

*Primary Examiner* — Alina N Boutah
(74) *Attorney, Agent, or Firm* — Moser Toboada; Joseph Pagnotta

(57) ABSTRACT

A method for minimizing application initialization delay comprising sending, from a privileged application executing on a mobile device, a registration message to a server, receiving, at the privileged application, a response message from the server, extracting, from the response message, application information and notifying the mobile device of the application information.

14 Claims, 3 Drawing Sheets

(56) References Cited

U.S. PATENT DOCUMENTS

| | | | |
|---|---|---|---|
| 2009/0296567 A1 | 12/2009 | Yasrebi et al. | |
| 2009/0307300 A1 | 12/2009 | Guedalia et al. | |
| 2009/0307678 A1* | 12/2009 | Wu | G06F 8/65 717/168 |
| 2009/0318124 A1* | 12/2009 | Haughn | G06F 8/65 455/418 |
| 2010/0029251 A1 | 2/2010 | McConnell et al. | |
| 2010/0177671 A1 | 7/2010 | Qiu et al. | |
| 2010/0189094 A1 | 7/2010 | Gray et al. | |
| 2010/0217837 A1* | 8/2010 | Ansari | G06Q 30/04 709/218 |
| 2010/0272250 A1 | 10/2010 | Yap et al. | |
| 2010/0275246 A1 | 10/2010 | Le Rouzic et al. | |
| 2010/0279662 A1 | 11/2010 | Kuusinen et al. | |
| 2010/0290361 A1 | 11/2010 | Kim et al. | |
| 2010/0312897 A1* | 12/2010 | Allen | H04L 12/1822 709/227 |
| 2010/0329243 A1* | 12/2010 | Buckley | H04W 48/18 370/352 |
| 2011/0029671 A1* | 2/2011 | Deprun | H04L 63/20 709/225 |
| 2011/0128954 A1 | 6/2011 | Veenstra et al. | |
| 2011/0138462 A1 | 6/2011 | Kim et al. | |
| 2011/0141920 A1 | 6/2011 | Yasrebi et al. | |
| 2011/0177793 A1* | 7/2011 | Kiiski | H04L 41/0273 455/411 |
| 2011/0216759 A1 | 9/2011 | Qian et al. | |
| 2011/0283185 A1 | 11/2011 | Obasanjo et al. | |
| 2011/0295996 A1 | 12/2011 | Qiu et al. | |
| 2012/0002674 A1 | 1/2012 | Murakami | |
| 2012/0005276 A1* | 1/2012 | Guo | G06F 17/30902 709/206 |
| 2012/0005373 A1 | 1/2012 | Nitta | |
| 2012/0014381 A1* | 1/2012 | Dwyer | H04W 48/18 370/352 |
| 2012/0021727 A1 | 1/2012 | Kelly | |
| 2012/0069774 A1 | 3/2012 | DuPertuis et al. | |
| 2012/0157098 A1 | 6/2012 | Singh et al. | |
| 2012/0213347 A1 | 8/2012 | Rosenberg et al. | |
| 2012/0216108 A1 | 8/2012 | Yambal et al. | |
| 2012/0263168 A1 | 10/2012 | Petrack | |
| 2012/0278457 A1 | 11/2012 | Yasrebi et al. | |
| 2012/0314699 A1 | 12/2012 | Qiu et al. | |
| 2012/0324061 A1 | 12/2012 | Parsons et al. | |
| 2013/0023275 A1 | 1/2013 | Mutya et al. | |
| 2013/0024812 A1 | 1/2013 | Reeves et al. | |
| 2013/0072150 A1 | 3/2013 | Williamson et al. | |
| 2013/0103686 A1 | 4/2013 | Sisneros | |
| 2013/0117381 A1 | 5/2013 | Garcia et al. | |
| 2013/0132573 A1 | 5/2013 | Lindblom | |
| 2013/0139143 A1 | 5/2013 | Rauma | |
| 2013/0159377 A1 | 6/2013 | Nash | |
| 2013/0159711 A1 | 6/2013 | Kaal | |
| 2013/0165185 A1 | 6/2013 | Guo et al. | |
| 2013/0177146 A1 | 7/2013 | Schneider et al. | |
| 2013/0185445 A1 | 7/2013 | Larkin | |
| 2013/0212166 A1* | 8/2013 | Willig | H04L 65/1016 709/203 |
| 2013/0225145 A1 | 8/2013 | Cherian et al. | |
| 2013/0244636 A1 | 9/2013 | Shukla et al. | |
| 2013/0314238 A1 | 11/2013 | Li et al. | |
| 2014/0254574 A1* | 9/2014 | Schreuder | H04M 7/0066 370/338 |
| 2014/0379925 A1* | 12/2014 | Kang | H04L 67/16 709/226 |
| 2015/0026786 A1* | 1/2015 | Alexander | H04L 63/1408 726/7 |
| 2015/0043429 A1* | 2/2015 | Kim | H04W 4/008 370/328 |
| 2015/0207867 A1* | 7/2015 | Igarashi | G06F 9/541 709/201 |
| 2015/0237077 A1* | 8/2015 | Suryavanshi | H04L 65/1083 709/204 |

* cited by examiner

METHOD AND APPARATUS FOR MINIMIZING APPLICATION DELAY BY PUSHING APPLICATION NOTIFICATIONS

CROSS-REFERENCE TO RELATED APPLICATIONS

This application is a continuation of co-pending U.S. patent application Ser. No. 13/901,224, filed May 23, 2013, which is incorporated herein by reference in its entirety.

BACKGROUND OF THE INVENTION

1. Field of the Invention

Embodiments of the present invention generally relate to a voice over internet protocol (VoIP) service, and more specifically, to a method and apparatus for minimizing application initialization delay by pushing application notifications.

2. Description of the Related Art

When an application moves from the background to the foreground of a mobile device, i.e., the application goes from being unused to being used by a user of the mobile device, the application may need to send one or more requests to one or more servers. For example, applications, i.e., mobile applications, may check for configuration changes, updates, whether a user account is still active, updating a contacts list, changes to licensing agreements, change to fees and charges, or the like. These application requests create a delay wherein the user of the mobile device cannot fully use the application while the requests are pending. Typically, the application will send an application programming interface (API) request for each check and the application will block other actions while waiting for a response, causing considerable delay perceptible by the user.

Therefore, there is a need in the art for a method and apparatus for reducing application update delay when moving the application to the foreground of a device in accordance with exemplary embodiments of the present invention.

SUMMARY OF THE INVENTION

Embodiments of the present invention relate to a method and apparatus for minimizing application initialization delay comprising sending, from a privileged application executing on a mobile device, a registration message to a server, receiving, at the privileged application, a response message from the server, extracting, from the response message, application information and notifying the mobile device of the application information.

Further embodiments of the present invention relate to a method for providing update information in a response message comprising receiving, at a registration service, a registration message from a mobile device, communicating with one or more third party services to determine if application information is updated for applications on the mobile device and forming a response message and appending the application information to the response message.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method for minimizing delay in mobile application initialization. According to one embodiment, an application with special privileges is stored in the memory of a mobile device. The operating system of the mobile device allows the privileged application to execute as a background process, and provides the privileged application with one or more handlers for handling incoming communication and a timer for periodically sending notifications to an external server while a non-privileged application may not execute as a background process and cannot perform any activity during hibernation. According to this embodiment, the privileged application periodically sends a registration message to a remote server and receives a response.

According to the present invention, the privileged application may also embed a request for updated data on behalf of non-privileged applications and receive an embedded update in the response message from the server to avoid an extraneous round-trip communication with a server from the non-privileged application as the non-privileged application is brought to the foreground. The privileged application extracts application notification information from the response and stores the information in a shared data store of the mobile device. Accordingly, non-privileged applications executing on the mobile device can selectively choose which updates to request from an external server based on the application notification information when they are brought to the foreground, minimizing the delay required after it is brought to the foreground.

Figure 1:
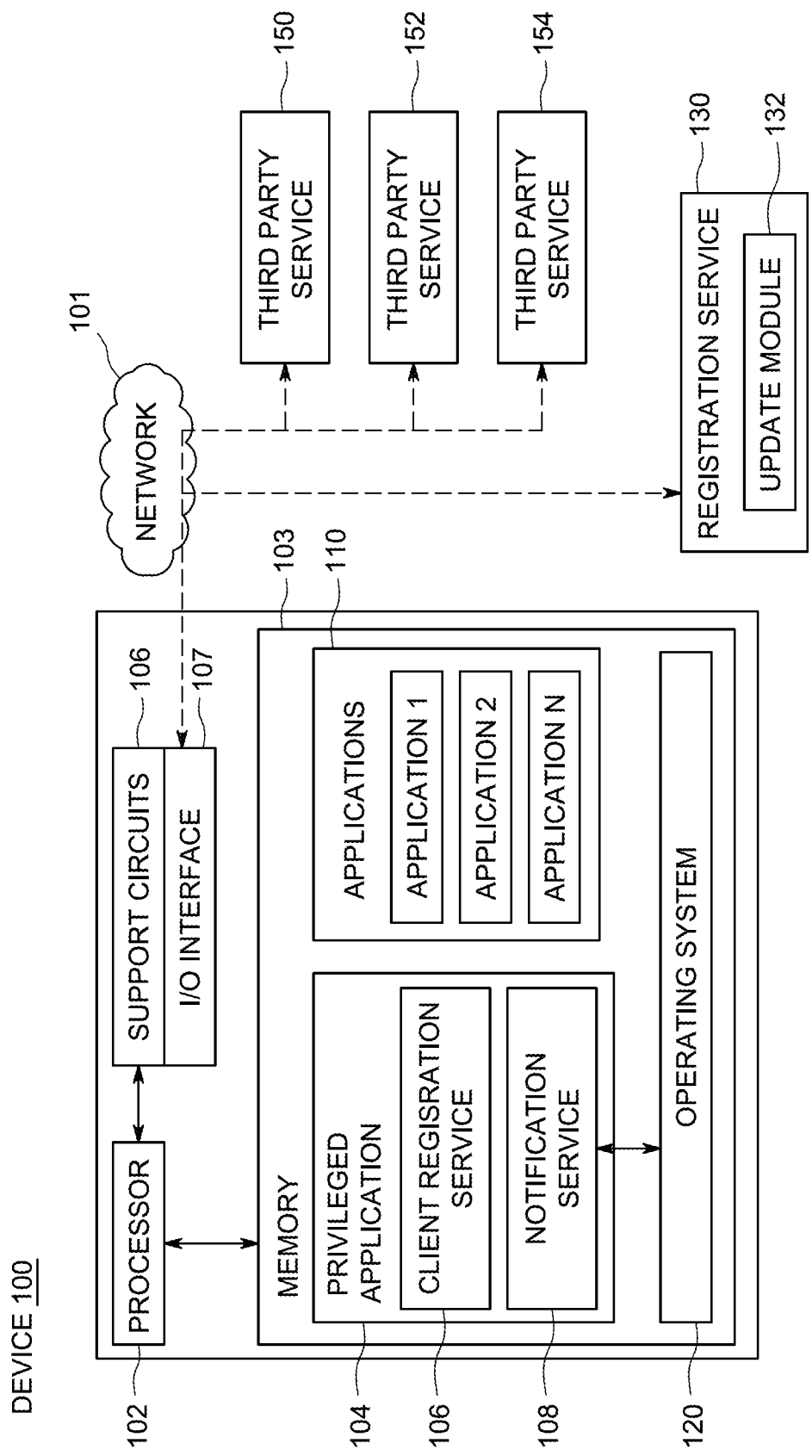
FIG. 1 depicts a device communicating with a registration service in accordance with at least one embodiment of the present invention.

FIG. 1 depicts a device 100 communicating with a registration service 130 in accordance with at least one embodiment of the present invention. The device 100 includes a processor 102, various support circuits 106, and memory 103. The processor 102 may include one or more microprocessors known in the art. The support circuits 106 for the processor 102 include conventional cache, power supplies, clock circuits, data registers, I/O interface 107, and the like. The I/O interface 107 may be directly coupled to the memory 103 or coupled through the support circuits 106. The I/O interface 107 may also be configured for communication with input devices and/or output devices such as network devices, various storage devices, mouse, keyboard, display, video and audio sensors, IMU and the like.

The memory 103, or computer readable medium, stores non-transient processor-executable instructions and/or data that may be executed by and/or used by the processor 102. These processor-executable instructions may comprise firmware, software, and the like, or some combination thereof. Modules having processor-executable instructions that are stored in the memory 103 comprise one or more privileged application 104, and applications 110, comprising one or more applications 1 . . . N. The device 100 may be programmed with one or more operating systems 120, which may include OS/2, Java Virtual Machine, Linux, SOLARIS, UNIX, HPUX, AIX, WINDOWS, IOS, and ANDROID among other known platforms.

The memory 103 and the memory 103 may include one or more of the following random access memory, read only memory, magneto-resistive read/write memory, optical read/write memory, cache memory, magnetic read/write memory, and the like, as well as signal-bearing media as described below.

The operating system 120 gives special privileges to a privileged application. For example, in APPLE IOS, only privileged applications, for example, voice over internet protocol (VoIP) applications, may execute as background processes allowing the privileged applications to perform tasks in the background, while another application is in the foreground. For example, if a user of the device 100 initially executes the VoIP application on device 100, the VoIP application will be in the foreground. However, when the user switches back to a home screen of the device 100, the device 100 places the VoIP application in the background, with privileged access.

Conversely, if the user initially executed a non-privileged application on device 100, such as a game (i.e., application 1), and subsequently switches back to the home screen, the operating system 120 of the device 100 will cause the game to hibernate. In hibernation state, the game cannot perform any background tasks such as checking an external server for game updates, score updates, contact updates or the like. However, when the user launches the game again, the operating system 120 of the device 100 will release the game from hibernation state and execute the game as a foreground process.

The privileged application 104 handles incoming communications even as a background process. The privileged application 104 may be programmed to send local notifications for alerting the user of the device 100, or handle notification information and go back to a suspended state, waiting for incoming communication. Alternatively, the privileged application 104 may execute a periodic communication to an external server through the client registration service 106. For example, if the privileged application 104 is a VoIP application, the VoIP application will send a registration message to a VoIP server through network 101, to registration service 130. According to some embodiments of the present invention, the registration message is a Session Initiation Protocol (SIP) REGISTER message, comprising information related to the internet protocol (IP) address of the device 100.

The registration service 130 is a remote service executing on a server, such as a VoIP server. The registration service 130 receives the registration message indicating the location of the device 100 and sends a response in return through the network 101 back to the device 100 through the I/O interface 107. According to exemplary embodiments of the present application, the update module 132 of the registration service 130 may also retrieve updates from third party service 150, third party service 152 and third party service 154, on behalf of applications 1 . . . N stored in device 100. Accordingly, the applications 1 . . . N will not have to contact remote servers to retrieve update information. In some embodiments, the update module 132 only includes flags indicating that a change has occurred. The applications 1 . . . N then may only make server requests corresponding to the flagged updates and do not perform server requests on items which are not flagged.

According to some embodiments, the updates may include checking for new configuration parameters, missed calls, system message waiting, determining whether a user or account is still active with the third party service, updating a contact list, changes to licensing or service, changes to the privacy policy, modifications to service rates, or the like. The update module 132 subsequently inserts proprietary headers into the server response from the registration service 130. According to exemplary embodiments, the server response is a 200 OK SIP response, and the update module 132 appends headers to the response corresponding to the application notification flags.

The I/O interface 107 couples the response to the client registration service 106 of the privileged application 104. The notification service 108 of the privileged application 104 extracts the headers from the response and extracts and application notification flags indicating which updates should be requested by any third party applications. Once the flags are extracted by the notification service 108, the privileged application 104 goes into a suspended state, and, as described above, will be woken periodically to perform registration and to acquire any new application flags.

For example, if the user launches the game application (application 1) once more, the game application requests a list of updated application flags relating to the game application from the operating system 120. If the notification service 108 retrieved any update flags from the registration service 130, the notification service 108 will store those flags in memory 103 of the device 100. According to one embodiment, the notification service 108 stores the application information in a shared data store of a device. According to one embodiment, whenever an application is launched, the notification service 108 intercepts server requests and only permits those service requests for which flags have been saved in memory 103.

According to another embodiment, the application from applications 1 . . . N determines on launch which server update request to perform based on the application flags stored in memory 103. According to yet another embodiment, the application flags contain the updated information, and the application 1, for example, retrieves the information from the memory 103 of device 100, instead of sending a request to a remote server. The application 1 may then launch, or move to the foreground of device 100, and allow the user to use the application 1 without an update delay.

According to an alternate embodiment, the notification service 108 may write the application flag data to shared data area of the device 100. For example, the notification service 108 may write data to a dummy contact, or a calendar entry, named "Application 1". Application 1 of the applications 110 will be programmed to access the "Application 1" contact, for example, to access its application flags, or its updated data. Application 2 will similarly extract the update data from the application information from contact "Application 2". According to embodiments of the present invention, the data may be shared with applications 110 by writing the data to any shared data store in memory 103, such as e-mail, text message or the like as understood by those of ordinary skill in the art.

Figure 2:
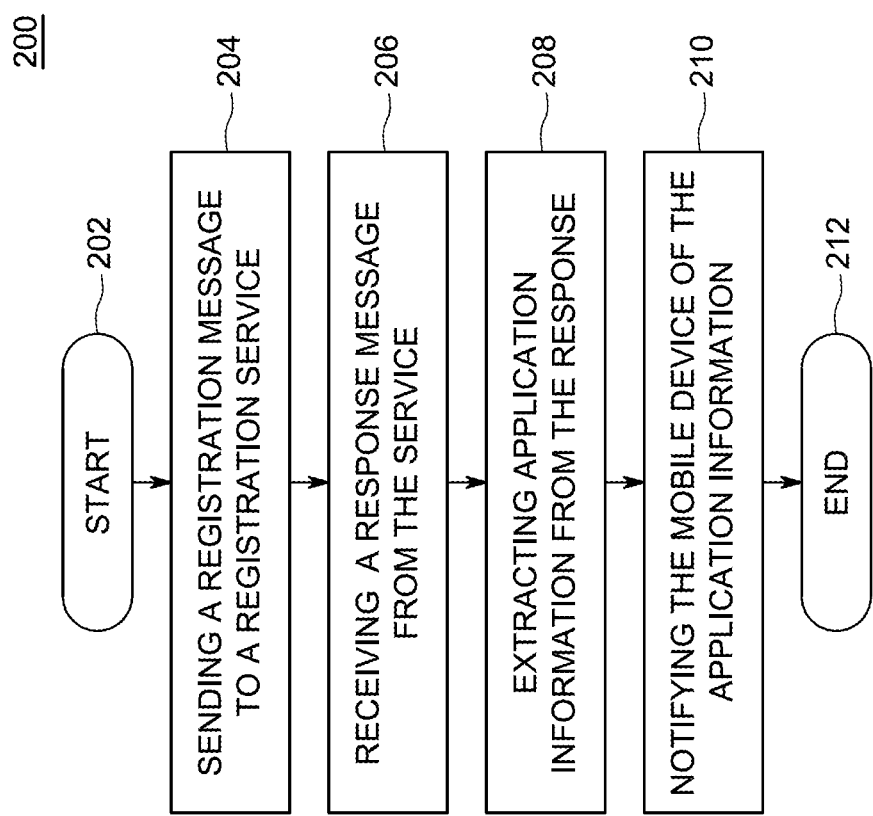
FIG. 2 depicts a flow diagram for a method for minimizing mobile application initialization delay in accordance with previous embodiment of the present invention as depicted in FIG. 1.

FIG. 2 depicts a flow diagram for a method 200 for minimizing mobile application initialization delay in accordance with previous embodiment of the present invention as depicted in FIG. 1. The method 200 is an exemplary implementation of the privileged application 104.

The method 200 begins at step 202 and proceeds to step 204. At step 204, a privileged application 104 executing on a device 100, such as a mobile phone, tablet or the like, uses client registration service 104 to send a register message to the registration service 130 through network 101. The privileged application 104 may be a VoIP application and the client registration service 106 may be a component of the VoIP application, or may be implemented as a separate service and stored in memory 103. The registration message may be a SIP REGISTER message used in VoIP applications, or may be any message that is periodically sent to a server. The privileged application 104 sends the registration message during the periodic timer assigned to privileged applications by the operating system 120, while the privileged application 104 is executing as a background process.

The method proceeds to step 206, where the client registration service 106 receives a response from the registration service 130. According to some embodiments, the response is an SIP 200 "OK" response to the registration message; though one of ordinary skill would recognize that any other response messages may be used.

The method then proceeds to step 208, where the notification service 108 extracts application information from the response received from the registration service 130. The application information may indicate which applications need to initiate an update, or may indicate a portion of updates that a particular application has to update.

According to some embodiments, updated application content may be embedded along with the application flags. For example, a third party service may, in one instance, provide a flag indicating that application configuration information such as a server address has changed. According to another instance, the third party service may send the registration service 130 the server address instead of the flag, thereby obviating the need for an application to request the new server address.

The method 200 then proceeds to step 210. At step 210, the notification service 108 notifies the mobile device 100 via the operating system 120. According to exemplary embodiments, the notification service 108 sends a message to the operating system 120 according to the norms of the operating system 120. In other instances, the notification service 108 may create or update contacts, calendar entries, emails, or the like, each associated with a particular Application of application 110 with the flag information.

For example, Application 1 may only check the contacts for a contact named "Application 1" for any application flags. When the user of device 100 brings Application 1 into the foreground, i.e. launches Application 1, or switches to Application 1, Application 1 initially checks the contact named "Application 1" to determine which parameters of Application 1 need to be updated. In contact "Application 1", three application flags are listed: "update configuration", "update score server to NEWSERVERADDRESS" and "subscription has changed".

Application 1 will only request the updated configuration, the new score server address and the user's subscription level, instead of requesting all updates which Application 1 would normally request, thereby minimizing the initialization delay of Application 1. The user is able to use Application 1 quickly after the user launches Application 1 without sensing a delay before the user interface reacts to the user's input. Subsequently, the method terminates at step 212.

Figure 3:
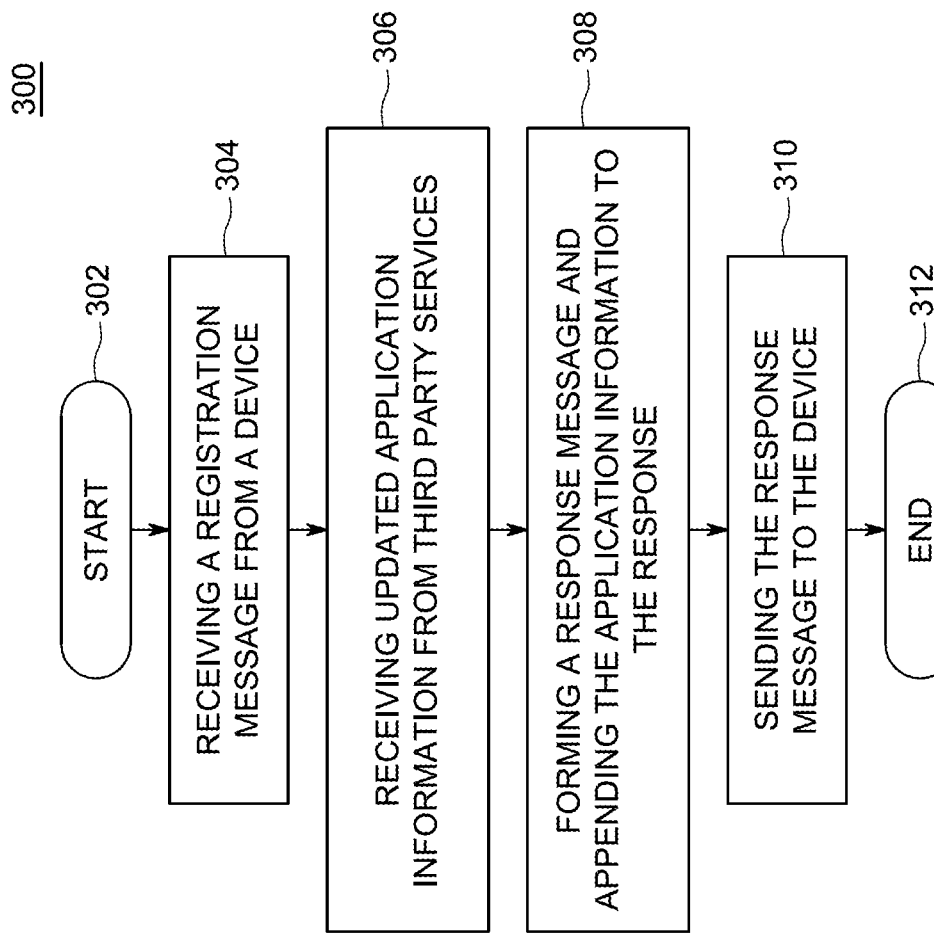
FIG. 3 depicts a flow diagram for a method for appending a registration method in accordance with previous embodiment of the present invention as depicted in FIG. 1.

FIG. 3 depicts a flow diagram for a method 300 for appending a registration method in accordance with previous embodiment of the present invention as depicted in FIG. 1. The method 300 is an exemplary implementation of the registration service 130.

The method 300 begins at step 302 and proceeds to step 304. At step 304, the registration service 130 receives a registration message from a device. According to exemplary embodiments, the device may be a VoIP device, and the registration message may be a SIP REGISTER message from the VoIP device. In other instances, the registration message may be any form of messaging sent to a server for registering location. The registration message may be an HTTP request or the like, as known to those of ordinary skill in the art. The device may be a non-VoIP device such as a mobile phone, executing a VoIP application.

The method then proceeds to step 306, where the update module 132 of the registration service 130 waits for an update from one or more third party services to determine if there is any application information available to update. For example, one or more of the third party services (for example, GOOGLE contacts) may notify the update module 132 that updated contact information is available. If the service has updated data, then according to one embodiment, the update module 132 will set a flag indicating that contact data is updated. According to another embodiment, the update module 132 will receive the updated contact data.

At step 308, the registration service 130 forms a response message and appends the application information, e.g., the contact flag, to a response to the registration message. According to some embodiments, the response is any SIP response, for example, an SIP 200 "OK" response. In some embodiments, the flag information is embedded into additional headers in the response message. According to other embodiments, the update data is embedded into the headers of the response message The method proceeds to step 310, where the registration service 130 sends the formed response to the device of origination. The method then terminates at step 312.

While the foregoing is directed to embodiments of the present invention, other and further embodiments of the invention may be devised without departing from the basic scope thereof, and the scope thereof is determined by the claims that follow.

The invention claimed is:

1. A method for providing application information updates in a response message, comprising:
   receiving, at a registration service, a registration message directly from a device;
   receiving application information updates from one or more third party services related to applications on the device;
   forming, in response to receiving the registration message, a response message comprising at least the application information updates;
   adding the application information updates into the response message, wherein the application information updates comprise updated content from the one or more third party services; and
   sending the formed response message to the device, wherein the response message enables the device to update information in the application.

2. The method of claim 1, wherein the application information updates are embedded into one or more headers of the response message.

3. The method of claim 1, wherein the formed response message to the registration message is an Session Initiation Protocol (SIP) 200 "OK" message.

4. The method of claim 1, wherein the registration service is a VoIP registration service, and wherein the registration message is a Session Initiation Protocol (SIP) REGISTER message.

5. The method of claim 4, wherein the formed response message to the registration message is an SIP 200 "OK" message.

6. The method of claim 5, wherein the application information updates are embedded into one or more headers of the SIP 200 "OK" message.

7. The method of claim 1, further comprising:
embedding application flag information into the response message, wherein the application flag information comprises flags indicating application information to be updated.

8. An apparatus for providing application information updates in a response message, comprising:
a registration service configured to:
receive a registration message directly from a device;
receive application information updates from one or more third party services related to applications on the device;
form, in response to receiving the registration message, a response message comprising at least the application information updates;
add the application information updates into the response message, wherein the application information updates comprise updated content from the one or more third party services; and
send the formed response message to the device, wherein the response message enables the device to update information in the application.

9. The apparatus of claim 8, wherein the registration service is further configured to embed the application information updates into one or more headers of the response message.

10. The apparatus of claim 8, wherein the registration service is a VoIP registration service, and wherein the registration message is a Session Initiation Protocol (SIP) REGISTER message.

11. The apparatus of claim 10, wherein the registration service is further configured to send a SIP 200 "OK" message as the response message to the registration message.

12. The apparatus of claim 11, wherein the registration service is further configured to embed the application information updates into one or more headers of the response message.

13. The apparatus of claim 8, wherein the registration service is further configured to send a SIP 200 "OK" message as the response message to the registration message.

14. The apparatus of claim 8, wherein the registration service is further configured to embed application flag information into the response message, and wherein the application flag information comprises flags indicating application information to be updated.

* * * * *